United States Patent
Kobayashi et al.

[11] Patent Number: 6,064,136
[45] Date of Patent: May 16, 2000

[54] ARMATURE AND METHOD FOR MANUFACTURING SAME

[75] Inventors: Takehiro Kobayashi; Shigeru Shiroyama, both of Tokyo, Japan

[73] Assignee: Mitsubishi Denki Kabushiki Kaisha, Tokyo, Japan

[21] Appl. No.: 09/097,699

[22] Filed: Jun. 16, 1998

[30] Foreign Application Priority Data

Jan. 20, 1998 [JP] Japan .................... 10-008890

[51] Int. Cl.⁷ .............. H02K 3/46; H02K 9/00; H02K 5/12
[52] U.S. Cl. .............. 310/270; 310/43; 310/45; 310/261; 310/271; 310/91
[58] Field of Search ............. 310/270, 42, 43, 310/45, 261, 91, 271, 208, 67 R, 233, 234, 235, 236; 29/596, 598

[56] References Cited

U.S. PATENT DOCUMENTS

| | | | |
|---|---|---|---|
| 2,565,139 | 4/1951 | Lessmann | 310/270 |
| 2,593,105 | 4/1952 | Compton, Jr. | 310/270 |
| 3,047,756 | 7/1962 | Coggeshall | 310/270 |
| 3,509,621 | 5/1970 | Honsinger et al. | 310/270 |
| 3,749,950 | 7/1973 | Lenz | 310/45 |
| 5,086,247 | 2/1992 | Morishita et al. | 310/270 |
| 5,473,213 | 12/1995 | Kahle, Sr. | 310/270 |
| 5,731,651 | 3/1998 | Hyodo | 310/261 |
| 5,845,389 | 12/1998 | Roberts et al. | 29/596 |

FOREIGN PATENT DOCUMENTS

| | | |
|---|---|---|
| 55-160955 | 12/1980 | Japan . |
| 61-34861 | 10/1986 | Japan . |

*Primary Examiner*—Nestor Ramirez
*Assistant Examiner*—Tran N Nguyen
*Attorney, Agent, or Firm*—Sughrue, Mion, Zinn, Macpeak & Seas, PLLC

[57] ABSTRACT

An armature in which a commutator and a lead-out section are firmly joined and satisfactory insulation is secured between an armature core and an armature coil. An armature (11) is equipped with: a shaft (2); an armature core (3) secured to the shaft (2); an armature coil (4) composed of conductors (4b) wound in slots (3a) formed in the armature core (3); a commutator (5) secured to the shaft (2); a belt-shaped member (13) which is provided to surround a lead-out section (4a) and which fastens a welded portion (A) where segments (8) of the commutator (5) and the lead-out section (4a) are ultrasonically welded; and a molded portion (12) which covers the outer peripheral surface of the armature core (3) and the outer peripheral surface of the lead-out section (4a).

4 Claims, 4 Drawing Sheets

ARMATURE AND METHOD FOR MANUFACTURING SAME

BACKGROUND OF THE INVENTION

1. Field of the Invention

The present invention relates to an armature in which the conductors of the lead-out section of an armature coil and the segments of a commutator are welded by an ultrasonic welding method, and a method for manufacturing same.

2. Description of Related Art

FIG. 6 is a sectional view showing an essential portion a conventional armature; FIG. 7 is a cross-sectional view taken along line VII—VII of FIG. 6; and FIG. 8 is a cross-sectional view taken along line VIII—VIII of FIG. 6.

An armature 1 is equipped with a shaft 2, an armature core 3 secured to the shaft 2, an armature coil 4 composed of conductors 4b wound in slots 3a formed in the armature core 3, a commutator 5 secured to the shaft 2, and a molded portion 6 which is made of an epoxy resin and which covers the armature core 3 and a lead-out section 4a of the armature coil 4.

The commutator 5 is equipped with a bushing 7 secured to the shaft 2, a plurality of segments 8 which are disposed at equal intervals dircumferentially around the shaft 2 and to which the conductors 4b of the lead-out section 4a are connected, and a molded member 9 which combines the segments 8 and the bushing 7 into one piece.

In the armature 1 configured as described above, the conductors 4b of the lead-out section 4a and the segments 8 are connected by ultrasonic welding. Then, the armature core 3, the armature coil 4, and the commutator 5 are heated to approximately 190 degrees Celsius and powder epoxy resin is electrostatically attached to the outer peripheries of the armature core 3 and the armature coil 4. The epoxy resin is melted by the retained heat of the armature core 3, the armature coil 4, and the commutator 5, and then is hardened by natural radiation cooling. Subsequently, a molded portion 10 is formed to cover the outer peripheral portion of the armature core 3, the lead-out section 4a, and a part of the outer peripheral portion of the commutator 5 as shown in FIG. 9. Afterwards, a portion of the molded portion 10 and an end of the lead-out section 4a are turned and an outer peripheral surface 5a of the commutator 5 that provides a surface with which a brush (not shown) comes into sliding contact, is subjected to finishing, thus completing the armature 1 shown in FIG. 6.

The lead-out section 4a and the segments 8 are welded by ultrasonic welding which makes use of the frictional heat generated from ultrasonic vibration. The ultrasonic welding method is based on solid phase welding behavior and it is essentially different from arc welding or solder welding. The connecting strength obtained by ultrasonic welding is lower than that obtained by arc welding or solder welding, and it is also lower than the strength of the connection between the conductors and the segments that is achieved by heat caulking.

Despite the lower connecting strength, the ultrasonic welding method is used for the following reasons:

(1) There is a danger that connecting the conductors 4b to the segments 8 of the commutator 5 by arc welding or solder welding will cause short-circuiting between adjacent segments, making the welding work difficult.

(2) If a method is employed in which a commutator has a flange with grooves at an end thereof and the conductors are thermally caulked in the grooves to connect the conductors of the armature coil with the segments of the commutator, then the formation of the flange accordingly adds to the amount of copper, the material used for the segments, and it is difficult to machine the grooves when manufacturing the commutator, leading to higher manufacturing cost.

In the conventional armature 1, the epoxy resin used for the molded portion 6 exhibits high viscosity when it is melted, presenting a problem in that insufficient entry of the epoxy resin into the slots 3a of the armature core 3 results in inadequate insulation between the armature core 3 and the armature coil 4 at the slots 3a.

When varnish is used for the molded portion 6 in place of the epoxy resin 6, the lower viscosity of varnish makes it easier for varnish to enter the slots 3a, so that insulation between the armature core 3 and the armature coil 4 is secured. There has been a problem, however, in that the amount of varnish applied to the outer peripheral surface of the armature core 3 and the outer peripheral surface of the lead-out section 4a is small. Accordingly the amount of varnish applied in the vicinity of the welded portion A weakly welded by ultrasonic welding between the conductors 4b of the lead-out section 4a and the segments 8 has been small. This has inevitably resulted in low joining strength between the lead-out section 4a and the commutator 5. Hence, there has been a danger that, when machining or lathe turning a portion of the molded portion 10 and the end of the lead-out section 4a, the cutting force may cause the conductors 4b of the lead-out section 4a to come off the segments 8 at the welded portion A.

Although it is possible to increase the amount of varnish applied to the area in the vicinity of the welded portion A to enhance the joining strength between the lead-out section 4a and the commutator 5, this would require extra time to heat the varnish to harden it and increase the time required to manufacture the armature.

SUMMARY OF THE INVENTION

The present invention has been made with a view toward solving the problems mentioned above, and it is an object of the present invention to provide an armature in which a commutator and a lead-out section are firmly joined and satisfactory insulation is secured between an armature core and an armature coil.

It is another object of the present invention to provide a method for easily manufacturing an armature in which a commutator and a lead-out section are firmly joined and satisfactory insulation is secured between an armature core and an armature coil.

To these ends, according to one aspect of the present invention, there is provided an armature equipped with: a shaft; an armature core secured to the shaft; an armature coil composed of conductors wound in the slots formed in the armature core; a commutator which is secured to the shaft and which has a plurality of segments; a securing means which is provided to surround the lead-out section and which fastens the welded portion where the respective segments and the conductors of the lead-out section have been ultrasonically welded; and a molded portion which is composed of varnish and which covers the outer peripheral surface of the armature core and the outer peripheral surface of the lead-out section.

In a preferred form, a cord made of glass fiber is employed as the securing means.

In another preferred form, a belt-shaped member composed of a plurality of turns of a cord made of glass fiber is employed as the securing means.

In a further preferred form, a belt-shaped member made of glass fiber and a metal ring fitted on the outer periphery of the belt-shaped member are employed as the securing means.

In a yet further preferred form, a ring made of a heat resistant resin is employed as the securing means.

According to another aspect of the present invention, there is provided a method for manufacturing an armature, which method including the steps of: welding a conductor of a lead-out section of an armature coil with each segment of a commutator by ultrasonic welding; surrounding the outer periphery of the lead-out section with a securing means to fasten the lead-out section; applying liquid varnish to the outer peripheral surface of an armature core and to the lead-out section; forming a molded portion on the outer peripheral surface of the armature core and the outer peripheral surface of the lead-out section by heating and hardening the varnish; and removing an end of the lead-out section together with the molded portion.

DESCRIPTION OF THE PREFERRED EMBODIMENTS

Figure 1:
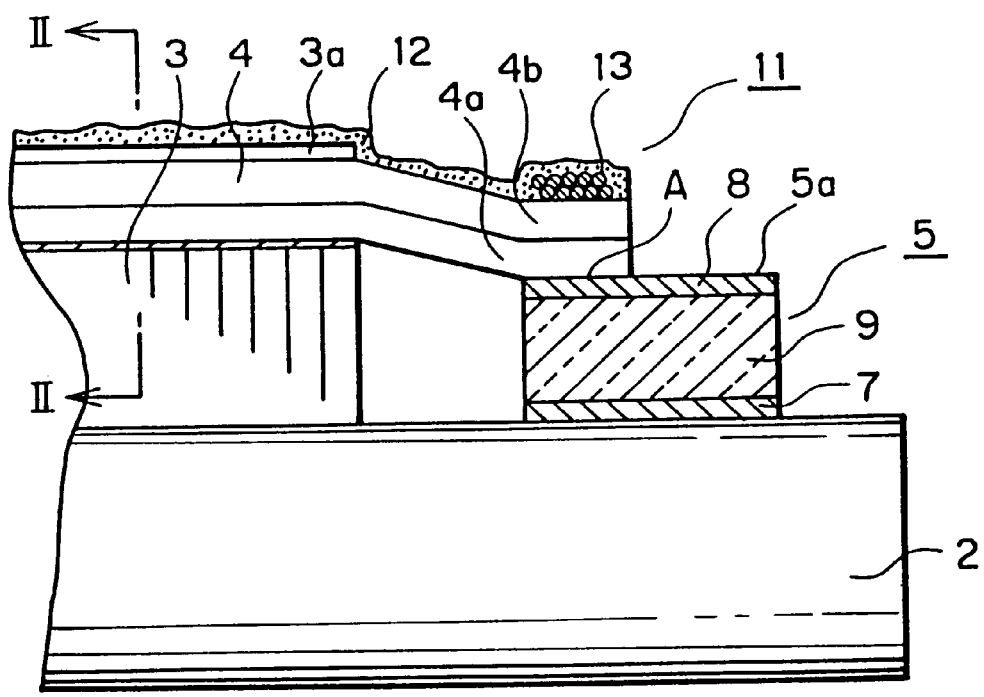
FIG. 1 is a sectional view illustrating an essential portion of an armature of a first embodiment in accordance with the present invention.
Figure 2:
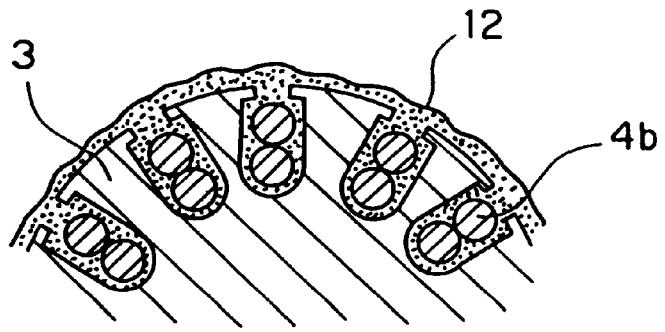
FIG. 2 is a cross-sectional view taken along line II—II of FIG. 1.

First Embodiment:

FIG. 1 is a sectional view illustrating an essential portion of an armature of a first embodiment of the present invention; and FIG. 2 is a cross-sectional view taken along line II—II of FIG. 1.

An armature 11 is equipped with a shaft 2, an armature core 3 secured to the shaft 2, an armature coil 4 composed of conductors 4b wound in slots 3a formed in the armature core 3, a commutator 5 secured to the shaft 2, a molded portion 12 which covers the outer periphery of the armature core 3 and the lead-out section 4a of the armature coil 4 and which is composed of varnish, and a belt-shaped member 13 serving as the securing means for fastening the lead-out section 4a. The belt-shaped member 13 is composed of a plurality of turns of a cord made of glass fiber.

The commutator 5 is equipped with a bushing 7 secured to the shaft 2, a plurality of segments 8 which are disposed at equal intervals circumferentially about the shaft 2 and to which the conductors 4b of the lead-out section 4a of the armature coil 4 are connected, and a molded member 9 which combines the segments 8 and the bushing 7 into one piece.

Figure 3:
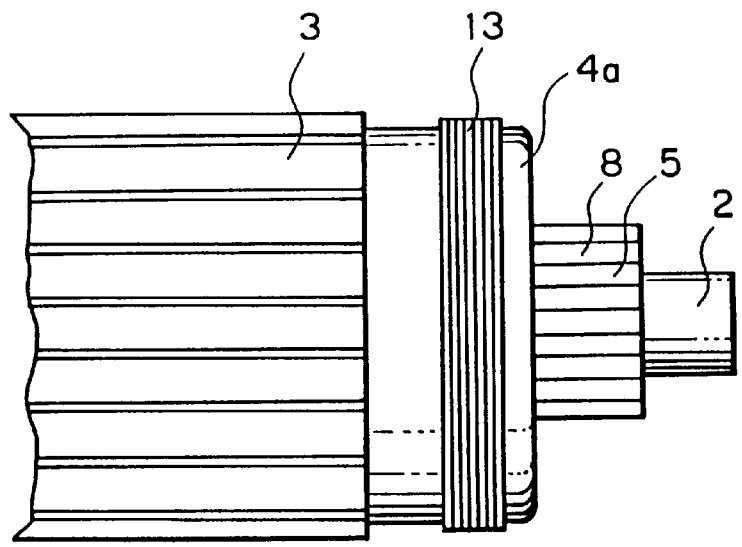
FIG. 3 is a top plan view illustrating the armature shown in FIG. 1 during the manufacturing thereof.

In the armature 11 configured as described above, the conductors 4b of the lead-out section 4a of the armature coil 4 and the segments 8 are welded by ultrasonic welding. Next, the cord composed of glass fiber is wound around the outer periphery of the lead-out section 4a a plurality of times while holding the cord at a predetermined tension to form the belt-shaped member 13, and the lead-out section 4a is firmly fastened with the belt-shaped member 13 as shown in FIG. 3. Afterwards, the armature core 3, the armature coil 4, and the commutator 5 are heated. Then, liquid varnish is dripped through a nozzle (not shown), while rotating the armature core 3, the armature coil 4, and the commutator 5 which have been heated to approximately 130 degrees Celsius, to apply it to the outer peripheral surface of the armature core 3 and the leadout section 4a. Afterwards, the varnish is heated to approximately 160 degrees Celsius and hardened to form the molded portion 12 on the outer peripheral surfaces of the armature core 3 and the lead-out section 4a. Next, the end of the lead-out section 4a is turned and removed together with the molded portion 12. Lastly, for finishing, the varnish is removed from a slide contact surface 5a of the commutator 5 where a brush (not shown) comes in sliding contact.

In this embodiment, the conductors 4b of the lead-out section 4a and the segments 8 of the commutator 5 are welded by ultrasonic welding and the welding strength at portion A is low; however, since the lead-out section 4a is fastened by the belt-shaped member 13, the lead-out section 4a and the commutator 5 are firmly joined. Hence, when the end of the lead-out section 4a is turned and removed together with the molded portion 12, it is possible to prevent the conductors 4b from coming off the segments 8 due to the turning force.

Further, since the molded portion 12 is composed of low viscosity varnish, the varnish fully enters the slots 3a of the armature core 3 low, thus securing satisfactory insulation between the armature core 3 and the armature coil 4.

In some cases, if the lead-out section 4a and the commutator 5 can still be firmly joined, the cord made of glass fiber may be wound only once.

Figure 4:
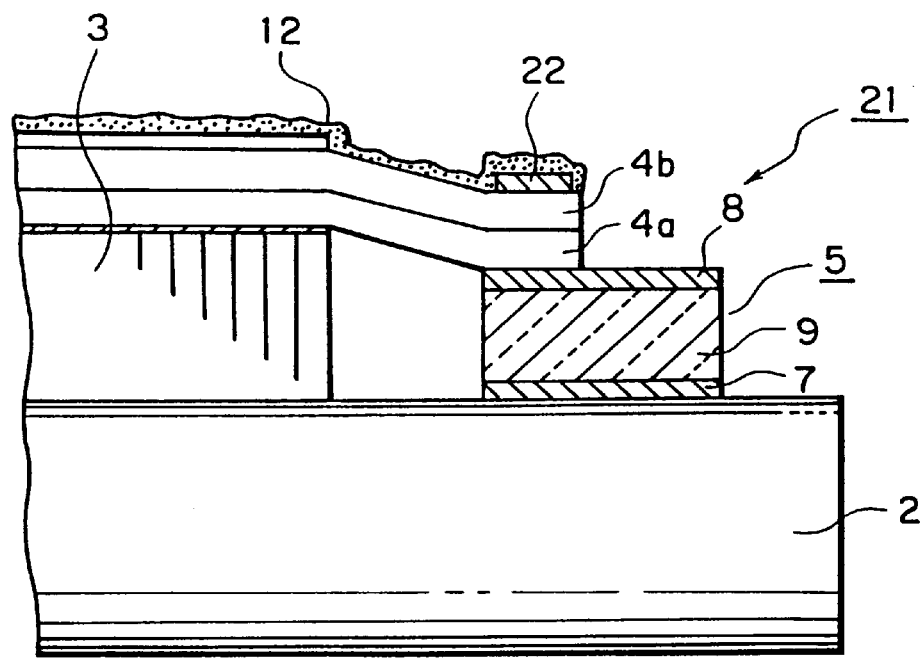
FIG. 4 is a sectional view illustrating an essential portion of an armature of a second embodiment in accordance with the present invention.

Second Embodiment:

FIG. 4 is a sectional view illustrating an essential portion of an armature 21 of the second embodiment in accordance with the present invention. The second embodiment differs from the first embodiment in that a ring 22 made of an epoxy resin, which is a heat resistant resin, is employed in place of the belt-shaped member 13 made of glass fiber.

Unlike the first embodiment, the second embodiment eliminates the process of winding the cord; instead, the ring 22 serving as the securing means is used to permit easy fastening of the lead-out section 4a.

Figure 5:
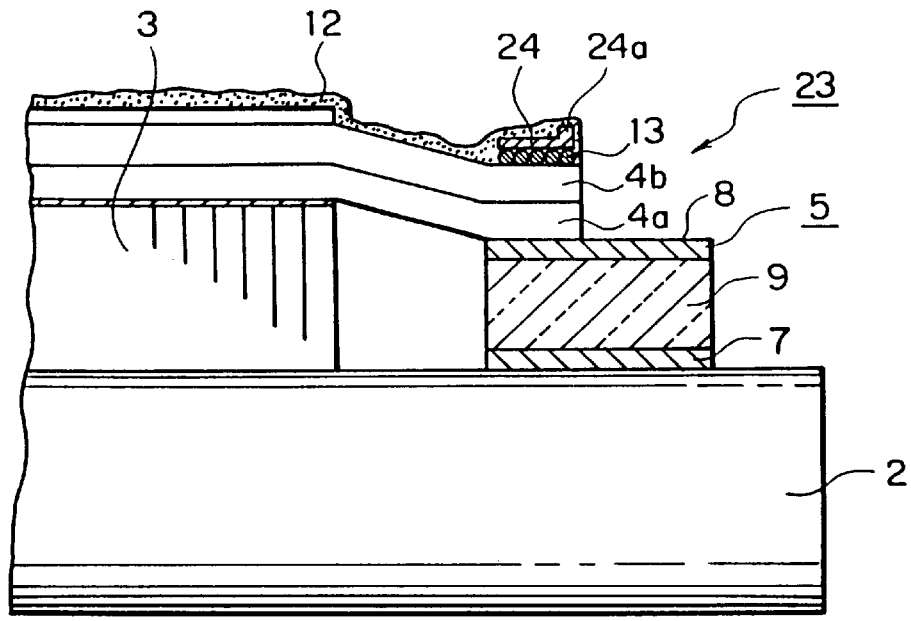
FIG. 5 is a sectional view illustrating an essential portion of an armature of a third embodiment in accordance with the present invention.
Figure 6:
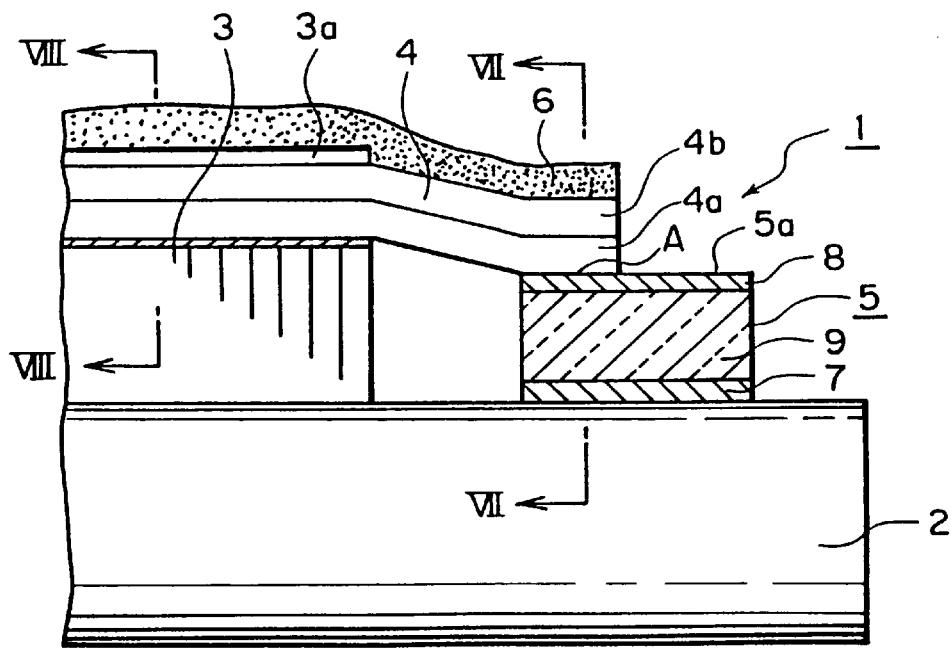
FIG. 6 is a sectional view of an essential portion of a conventional armature.
Figure 7:
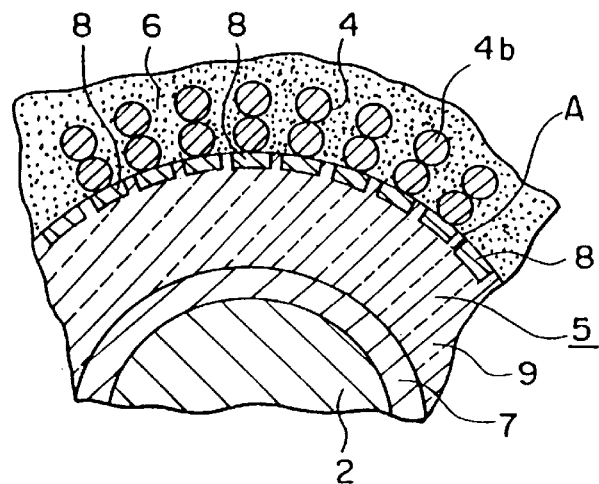
FIG. 7 is a sectional view taken along line VII—VII of FIG. 6.
Figure 8:
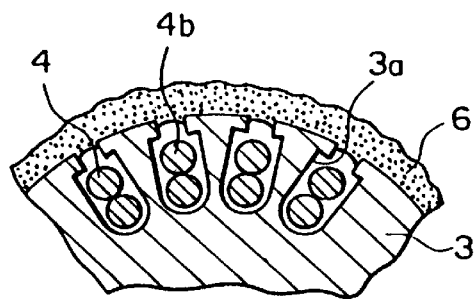
FIG. 8 is a sectional view taken along line VIII—VIII of FIG. 6.
Figure 9:
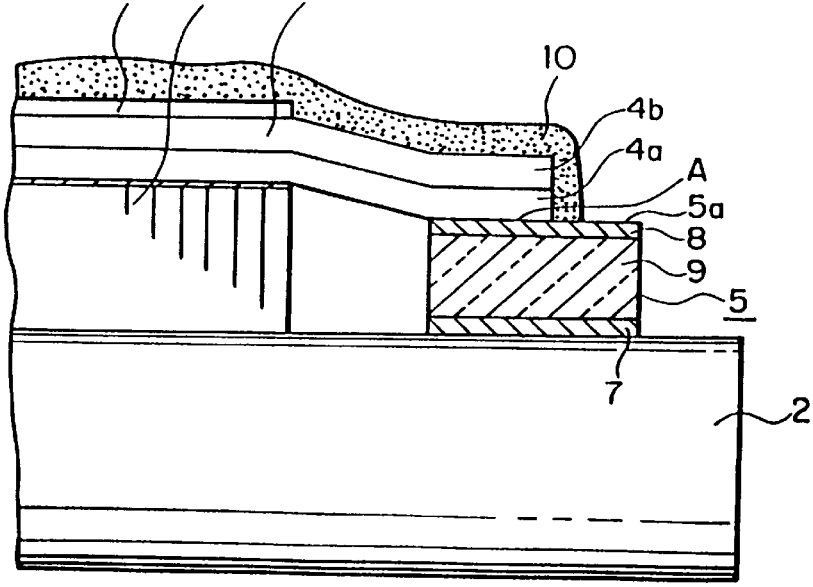
FIG. 9 is a sectional view illustrating an essential portion of the armature shown in FIG. 6 during the manufacturing process thereof.

Third Embodiment:

FIG. 5 is a sectional view illustrating an essential portion of an armature 23 of a third embodiment in accordance with the present invention. The third embodiment differs from the first embodiment in that a ring 24 with an iron flange 24a is fitted on the outer peripheral surface of a belt-shaped member 13.

This embodiment uses the belt-shaped member 13 and the ring 24 constituting the securing means so that compared to the first embodiment, the lead-out section 4a can be further firmly fastened. The ring 24 can be pushed into the lead-out section 4a by using the flange 24a to fit the ring 24 onto the outer peripheral surface of the belt-shaped member 13: thus allowing the ring 24 to be easily fitted onto the outer peripheral surface of the belt-shaped member 13.

Thus, the armature in accordance with the present invention is provided with: a shaft; an armature core secured to the shaft; an armature coil composed of conductors wound in the slots formed in the armature core; a commutator secured to the shaft; a securing means is provided to surround the lead-out section and which fastens the welded portion where the segments and the conductors of the lead-out section have been ultrasonically welded; and a molded portion which is composed of varnish and which is provided to cover the outer peripheral surface of the armature core and the outer peripheral surface of the lead-out section. Hence, the commutator and the lead-out section are firmly joined, thus preventing the conductors from coming off the segments when cutting the end of the lead-out section together with the molded portion. In addition, the conductors at the lead-out section are prevented from scattering due to centrifugal force when the armature is rotated.

Further, since the molded portion is composed of the low Viscosity varnish, the varnish fully enters the slots of the armature core, thus ensuring satisfactory insulation between the armature core and the armature coil.

Furthermore, using the cord made of glass fiber as the securing means provides higher mechanical strength and it also makes it possible to firmly fasten the lead-out section with the cord which has insulating properties, thus enabling the lead-out section and the commutator to be firmly joined.

Further, the use of the belt-shaped member composed of a plurality of turns of a cord made of glass fiber as the securing means provides higher mechanical strength and also makes it possible to firmly fasten the lead-out section with the belt-shaped member which has insulating properties, thus enabling the lead-out section and the commutator to be firmly joined.

Moreover, the belt-shaped member composed of a plurality of turns of a cord made of glass fiber and the metal ring fitted on the outer peripheral portion of the belt-shaped member are employed as the securing means. This makes it possible to further firmly fasten the lead-out section, thus enabling the leadout section and the commutator to be further firmly joined.

Further, the use of the ring made of a heat resistant resin allows the lead-out section and the commutator to be easily joined by fitting the ring onto the lead-out section.

Moreover, the method for manufacturing an armature in accordance with the present invention includes the steps of welding a conductor of a lead-out section of an armature coil with each segment of a commutator by ultrasonic welding; surrounding the outer periphery of the lead-out section with securing means to fasten the lead-out section; applying liquid varnish to the outer peripheral surface of an armature core and to the outer peripheral surface of the lead-out section; forming a molded portion on the outer peripheral surface of the armature core and the outer peripheral surface of the lead-out section by heating and hardening the varnish; and removing an end of the lead-out section together with the molded portion. Hence, the commutator and the lead-out section are firmly joined, and the low viscosity varnish fully enters the gap between the armature core and the armature coil, thus permitting easy manufacture of an armature which provides satisfactory insulation.

What is claimed is:

1. An armature comprising:

a shaft;

an armature core secured to said shaft;

an armature coil composed of conductors wound in slots formed in said armature core;

a commutator which is secured to said shaft and which has a plurality of segments;

a securing means which is provided to surround a lead-out section of the armature coil, wherein said securing means fastens a welded portion where said respective segments and said lead-out section have been ultrasonically welded; and a molded portion which is composed of varnish and which covers an outer peripheral surface of said armature core and the outer peripheral surface of said lead-out section; and further wherein said securing means is a belt-shaped member composed of a plurality of turns of a cord made of glass fiber and a metal ring fitted on the outer periphery of said belt-shaped member.

2. An armature according to claim 1, wherein said securing means is a cord made of glass fiber.

3. An armature according to claim 1, wherein said securing means is a belt-shaped member composed of a plurality of turns of a cord made of glass fiber.

4. An armature according to claim 1, wherein said securing means is a ring made of a heat resistant resin.

* * * * *